July 3, 1956  A. C. PETERSON  2,753,005
TILTABLE ROTOR UNIT WITH COUNTER-ROTATING PROPELLERS
Filed Dec. 29, 1951  2 Sheets-Sheet 1
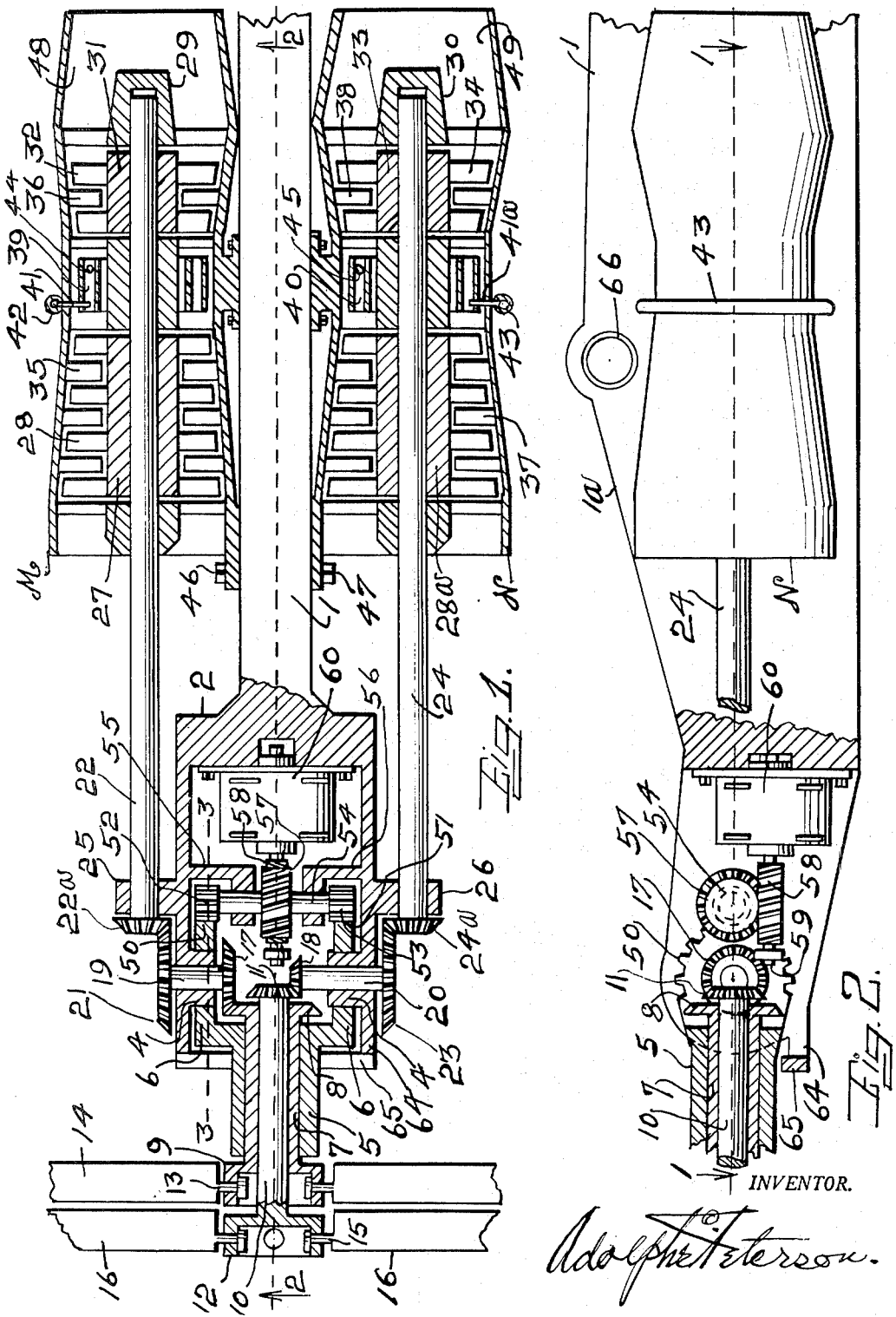
INVENTOR.
Adolphe C. Peterson July 3, 1956     A. C. PETERSON     2,753,005
TILTABLE ROTOR UNIT WITH COUNTER-ROTATING PROPELLERS
Filed Dec. 29, 1951     2 Sheets-Sheet 2
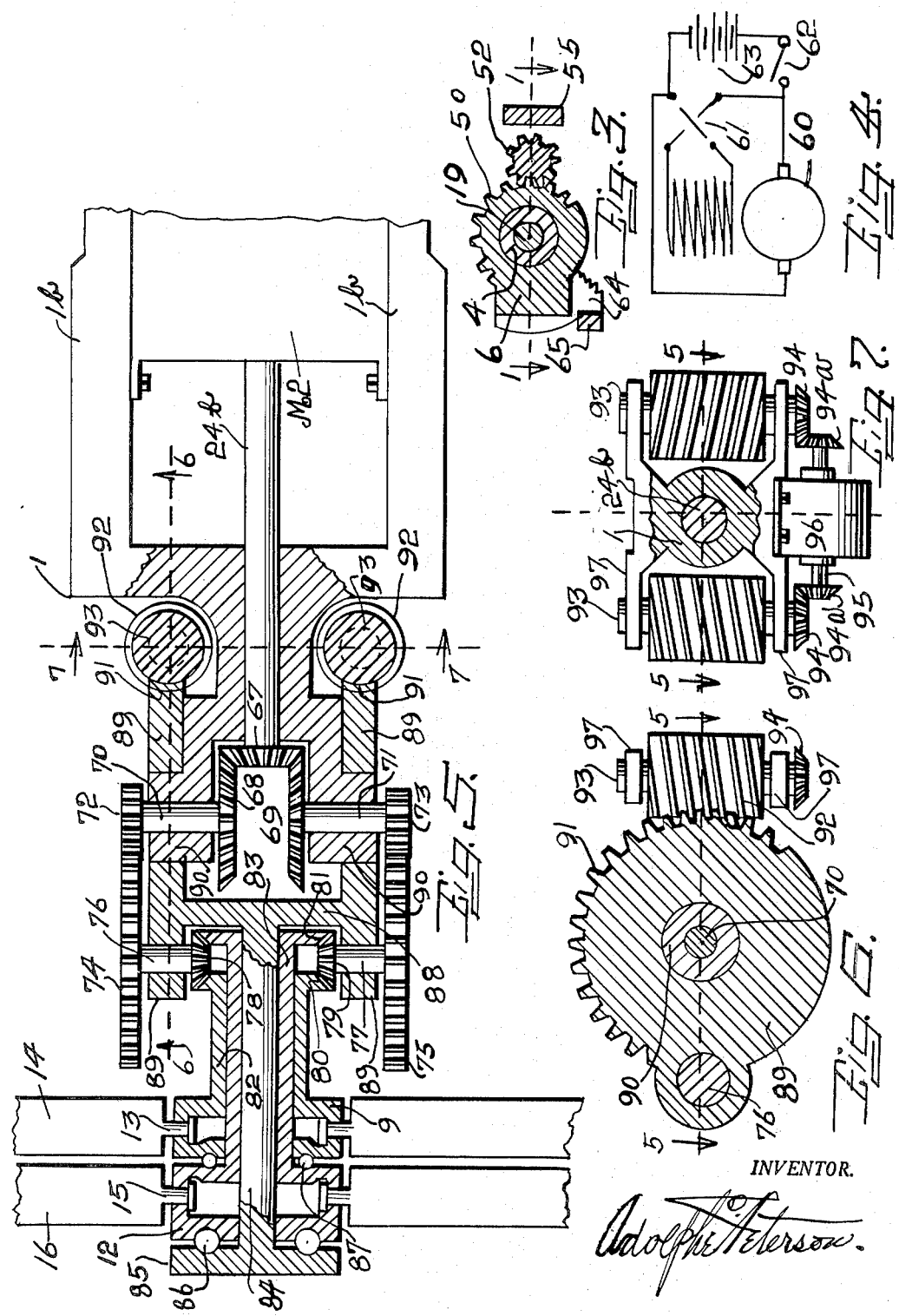
INVENTOR.
Adolph C. Peterson United States Patent Office 2,753,005
Patented July 3, 1956

1

2,753,005

TILTABLE ROTOR UNIT WITH COUNTER-ROTATING PROPELLERS

Adolphe C. Peterson, Edina, Minn.

Application December 29, 1951, Serial No. 264,150

1 Claim. (Cl. 170—135.26)

My invention relates to aircraft and in particular to a rotor means for air-craft and a unit construction power means for air-craft.

The principal objects of my invention are to provide a system of rotors and a rotor construction which will provide both propulsion and sustentation for an air-craft and which may be used in conjunction with mean wing sustentation means for air-craft so as to provide for the air-craft construction the means of so converting the system that the air-craft will have the usual features of adaptability to high speed in translational flight and so that the air-craft will also have the ability for slow forward movement with at the same time sufficiently slow descent from altitude, so that alighting of the air-craft may be more safely accomplished in conditions not usually suitable for descent of large air-craft.

An object is to provide a type of rotor means and drive for that rotor which will enable the rotor system, even with a relatively simple construction, to be converted in flight from the condition of forward horizontal propulsion with fixed wing sustentation to the condition of rotor sustentation for very slow horizontal flight or slow descent, or will enable the rotor system, to be converted in flight from the condition of rotor sustentation to the condition of wing sustentation with forward flight at high speed, and which will enable the air-craft to have variable combinations of this condition. An object is to enable the apparatus of the air-craft to have not only such slow hovering descent or slow take-off but also to have automatically, under such conditions of the apparatus, a braking of speed under the condition of alighting upon ground or other objects.

In general the object is to provide an improved form of airfoil rotor means with an engine means and transmission means in such association, that the means may be used in an aircraft having wing sustentation means, to provide adequate and effective use of the rotor means either as horizontal propulsion means or as aircraft sustentation means.

The principal devices and combinations of devices constituting my invention, are as hereinafter described and as defined in the claim. In the accompanying drawings which illustrate my invention, like characters refer to like parts throughout the several views. Referring to the drawings:

Figure 1 is a view chiefly in horizontal section through the principal power elements and the principal transmission elements and a portion of a supporting beam for mounting the unit on an aircraft, the section being on a plane on the line 1—1 of Figure 2, some parts being in full plane view and some broken away.

Figure 2 is a view chiefly in side elevation of the unit shown in Figure 1, some parts being in vertical section on the line 2—2 of Figure 1, some parts being broken away.

Figure 3 is a detail view of a vertical section on the line 3—3 of Figure 1, some parts being broken away.

Figure 4 is a diagrammatic illustration of the control circuit for the motor of the rotor transition means.

2

Figures 5, 6, and 7 are views of a modified form and of these views—

Figure 5 is a view chiefly in horizontal section similar to that of Figure 1, some parts being in full plan view and some broken away.

Figure 6 is a detail view in vertical section on the line 6—6 of Figure 5, this view showing, in section, one part of the rotor support and position changing means, on one side of the vertical plane passing through the shafts of the rotors. It should be noted that a section through the opposite similar means would be substantially similar.

Figure 7 is a vertical detail section on a plane at right angles to the plane of Figure 6, this section being a section through the pair of worms effecting rotor position changes, the electric driving motors being shown in association.

The unit shown in Figures 1, 2, 3, 4, has a main supporting beam 1 which at its forward end has formed or secured to it a bifurcated rotor support 2. The beam 1 is formed of as many elements for construction as may be necessary although it is illustrated in the simplest manner as one integrally formed member. The supporting beam 1 with all its parts and carrying the rotor and transmission and power means, as are hereinafter described, is contemplated to be any beam which may be mounted on a wing aircraft or formed as a part of its structure to perform the function of support for the said means and conversely also to give sustentation support to the aircraft, when the rotor means, as hereinafter described, provides support or sustentation.

The supporting beam 1 has on its rotor support 2 a pair of horizontally disposed rotor support bearings each designated as 4 and each of which is in axial alignment with the other and formed integrally with the rotor support 2 or securely attached to it. Each support bearing 4 has an internally formed bearing surface and an externally formed bearing surface, each having the same axis, the axes of the support bearings 4 being horizontally disposed transversely of the rotor support 2 and beam 1 generally at right angles to the longitudinal length of beam 1 and in alignment. The support bearings 4 have mounted externally of them, that is on their external cylindrical surface, the bifurcated near end of the rotor post or, as it may be called rotor pylon, designated generally as 5, the bifurcated ends being designated 6 and one of the latter being oscillably mounted on one support bearing 4, externally thereof, and the other being mounted on the other support bearing 4, externally thereof. The mounting of the rotor pylon 5 is such that it may swing from the horizontal position, extended forwardly from beam 1 and in alignment longitudinally therewith, to any selected position in the vertical plane passing vertically and longitudinally rearwardly centrally of beam 1 between the horizontal position shown and a position in which the axis of the rotor pylon is approximately 135 degrees more or less of rotation upwardly and backwardly, that is from a position in the horizontal plane as shown in Figure 1 and Figure 2 to any position of varying degrees to the horizontal rising upwardly in the plane until the position extending at right angles vertically upwardly from the axis of support bearings 4 is reached, and then still further in the vertical plane until a position which may be say approximately thirty degrees or even as much as forty five degrees to the vertical and just behind the vertical.

The rotor pylon 5 is of a length such that the upper or remote end, from its axis of rotation, is in ordinary constructions several feet from the axis and it has an internal bearing bore extending entirely through its length thereof from the outward remote end to the space between the bifurcated ends 6 and in this bore there is rotatably mounted a rotor sleeve shaft 7, which has at its inner end the bevel gear 8 fixed on it and has on its outer end fixed on it the rotor hub 9. The rotor sleeve shaft 7 has an internal bore wherein there is rotatably mounted a second rotor shaft 10, this shaft being somewhat longer than the shaft 7 and extending through it, this shaft 10 having at its inner end firmly fixed to it a bevel gear 11 and having at its outer end firmly fixed to it a rotor hub 12, this hub being slightly further away from the axis of support bearings 4. The rotor hub 9 has mounted in it the hub ends 13 of four propeller blades 14, so that these blades will be held firmly. The rotor hub 12 has mounted in it the hub ends 15 of four propeller blades 16, so that these blades will be held firmly. The blades of rotor hub 9 are mounted so that they cause forward propulsion in revolution one way, say the clockwise way, and the blades of rotor hub 12 are mounted so that they will cause forward propulsion in the same direction in rotation of this rotor hub 12 in the opposite way from the rotation of rotor hub 9. The sleeve shaft 7 at its opposite end has bevel gear 8 and rotor shaft 10 at that opposite end has bevel gear 11, the bevel gear 8 being larger than the bevel gear 11, so that the one may cooperate or is geared permanently with a bevel gear 17 and the other is permanently in gear with bevel gear 18, the latter being smaller than bevel gear 17.

The bevel gear 17 is fixed on the inner end of a short drive shaft 19 and the bevel gear 18 is fixed on the inner end of the short shaft 20. The short shafts 19 and 20 are rotatably mounted, one in the internal bore of support bearing 4 on one side of the vertical central plane and the other short shaft is mounted in the support bearing 4 on the other side of that central plane, so that thereby one short shaft 19 may drive the one propeller hub and its blades and the other may drive the other propeller hub and its blades through their respective rotor shafts 7 or 10.

The short shaft 19 on its opposite end has fixed on it the bevel gear 21 engaging gear 22a on the front end of a turbine shaft 22, and the short shaft 20 on its opposite end has fixed on it the bevel gear 23 engaging gear 24a on the front end of another turbine shaft 24. The turbine shafts 22 and 24 are at their front ends or near that, rotatably supported in bearings 25, 26 fixed on beam 1, and the turbine shafts extend rearwardly a considerable distance from the bevel gears 21, 23, and parallel to each other and parallel to the beam 1 and in a horizontal plane, to the turbine units generally designated M and N, and one turbine shaft has fixed on it the compressor rotor 27, having blades 28 of the axial flow type, and the other shaft has fixed on it the compressor rotor 28a having blades of the axial flow type. The turbine shafts are further extended rearwardly, supported by bearings 29, and 30, respectively, and the one turbine shaft has the turbine rotor 31 fixed on it and having blades 32 and the other turbine shaft has the turbine rotor 33 fixed on it and having turbine blades 34. The shafts 22 and 24 are not in any way fixed or coordinated together in their movement rotatably, and each rotates in the direction necessary to procure the opposite rotation of the rotor hubs 9 and 12, respectively. The reduction of drive through the gears to the rotor hubs is as much as may be necessary or appropriate in any construction, any additional reduction gears or type of reduction gears being added to the construction if it be found necessary to procure the adequate speed reduction in the drive from the turbines.

The turbine M has the stator compressor blades 35 and stator turbine blades 36 and the turbine N has the stator compressor blades 37 and the stator turbine blades 38, and the turbine M has combustion chamber 39 of annular type and the turbine N has combustion chamber 40 of annular type and the turbines have fuel nozzles 41 and 41a respectively and each has a separate or individual fuel supply conduit 42 and 43 respectively, these being supplied from fuel supply pumps of any type (not shown), and independently controlled so that the turbines may be independently operated or may both be operated at the same time. The turbines have ignition elements 44 and 45, respectively, each being supplied with ignition current in any manner.

The turbine M is bolted to or otherwise securely attached to beam 1 at one side, bolts 46 being shown, and the turbine N is bolted by bolts 47 or by any means is fixed firmly to the other side of beam 1. The turbines are fixed one on one side and the other on other side of beam 1 but in the same horizontal plane and rearwardly of the longitudinal length of the beam 1. The turbine M exhausts by the jet propulsion tube 48 to atmosphere and the turbine N exhausts by the jet propulsion tube 49 to atmosphere, both exhausting in the horizontal plane and rearwardly in the direction of flight, for translational movement of the air-craft.

The bifurcated ends of the rotor pylon or post, which are designated 6, have each formed on their external surface, a spur gear, sector shaped and denoted 50 and 51, respectively, one in permanent engagement with small spur gear 52 and the other in permanent engagement with small spur gear 53, the small gears 52 and 53 being horizontally disposed in axial alignment and each fixed on shaft 54 which is rotatably mounted in bearings 55, 56 fixed on beam 1, and the shaft 54 has large worm gear wheel 57 fixed on it and in engagement with a small worm gear pinion 58 placed under it, the pinion 58 being fixed on shaft 59 which in turn has the armature of electric motor 60 fixed on it the motor 60 being, as shown in Figures 1, 2 secured on the near part of beam 1. The electric motor 60 may thus be used to turn spur gears 52, 53 and thereby turn the bifurcated ends 6 of the rotor pylon 5 and this results in turn in the swinging of the rotor pylon 5 with its rotors about the axis of the supporting bearings 4 as a bearing, the direction in which the swing is made depending on the direction of rotation of the armature of electric motor 60, which is a reversible motor, controllable according to the placing of a reversing switch 61 and a main switch 62, as shown in the diagrammatic sketch, Figure 4, a battery 63 or other means furnishing current. Each motor 60 of any number of these rotor systems on an air-craft (one being shown) may be controlled by one reversing switch 61 and main switch 62 or by any such means for each such rotor system. Any indicating means showing the positions of the rotor pylons in the plane of their swing may be used to inform the pilot of that position, such means not being shown for simplicity in the drawings and description, or in lieu thereof the pilot may himself observe from his position in the fuselage or wing unit, the positions of rotor pylons in their swing, so that he may thus place the rotor pylons in the relative position in the arc of swinging, as he chooses. It should be noted that the worm wheel 57 and worm pinion 58 have such a small angle of inclination in their thread, to secure large ratio of multiplication of drive, that these elements 57 and 58, will hold the rotor pylon in any of its positions in the arc of swinging, as he may choose. The rotor pylon 5 will by its construction have a total swing in the arc of or plane of swing which is approximately 120 degrees or even as much as 135 degrees, so that the rotor pylon with its rotors may swing from the horizontal position, shown in Figures 1 and 3 and 7 to the extreme rearward position of about 30 degrees or at most 45 degrees behind the vertical or only to the 90 degree or vertical position, that is, the position extending vertically upwardly from the axis of oscillation. The bifurcated members of part 2 of beam 1 have brackets 64 which support a horizontal transverse bar 65 placed immediately under the rotor pylon 5 which thereby limits the downward movement of the rotor pylon to that of the horizontal as shown in Figures 1 and 2, thereby preventing any accidental placing of the rotor pylon below that horizontal angle.

The beam 1 near or at its mid-longitudinal position, has an upwardly extending section 1a of the beam, and this section 1a has mounting or attaching fixtures or bearings 66 firmly secured on it or formed on it, and these form mountings by which the beam 1 may be secured in an aircraft structure. This attachment in or as a part of an aircraft structure may be by any means which will adequately secure the beam 1 and its associated means in the aircraft structure as a part thereof and in such maner that the relative horizontal position of beam 1 will be maintained, such attachment means being merely diagrammatically shown.

Having described, in detail, the rotor means and the associated power and transmission means, the general use and operation is now explained. In use of my device, a rotor system and associated means, such as been above described, is mounted by the supporting beam 1, in any appropriate manner and location upon the structural frame of the winged aircraft with which it is to be used, and there may be as many of such units, as has been described, mounted on the associated winged aircraft, as is deemed appropriate for the particular construction. Since aircraft, employing rotor means for sustentation as well as for horizontal propulsion are now well known, it may be especially noted that mounting of a rotor means and associated means, such as my system which has been hereinabove described, on a winged aircraft of any of the commonly known types, straight wing, swept wing, delta wing, is contemplated to be the purpose and use of my device, although an associated winged aircraft is not specifically illustrated.

The mounting of a rotor means, the unit described, will always be such that the rotors, when in the position shown in Figures 1 and 2, that is the position wherein the rotor shafts are in a position to rotate on a horizontal axis, will in rotation give forward propulsion in the horizontal direction, to the associated aircraft on which the means is mounted; and that mounting will also be such that when the rotor pylon, that is the mounting of the rotors, is swung about its axis to the vertically upward position, at approximately ninety degrees of rotation upwardly about the axis, the rotors will, in their rotation, by thrust downwardly upon the air, and conversely pull upwardly upon the associated aircraft, provide sustentation for the associated aircraft, in a degree substantially in proportion to the power of the turbine means imparted to the rotors.

The rotor pylon will be controlled to effect the changes in position, for either of the operating conditions, by the electric control means, such as is diagrammatically illustrated in Figure 4, or any other means such as may be provided for control of the electric motor 60 of the rotor means. When the current flow is controlled to give flow of current in one way, in the motor 60, the gears 52, 53, will be rotated in one direction to swing the members 50, and the rotor pylon 5, in one direction rotatively about the axis of the rotor pylon, which is the same as the axis of the shafts 19, 20; and when the current flow is controlled to give flow of current in the alternative way, in the motor 60, the gears 52, 53, will be rotated in an opposite direction, and that opposite direction of rotation, will swing the members 50, and the rotor pylon 5, in the opposite direction rotatively about the axis of the rotor pylon. Thus, by this control, either position of the rotor pylon, that for forward propulsion by the rotors, or that for vertical sustentation, by the rotors, may be secured, according to the desire of the pilot, and the immediate need for forward propulsion, or vertical sustentation, of the associated aircraft. In such shifting of position, the turbines M and N, will continue the driving of the rotors, in the opposite directions of rotation, since that rotation is imparted through the pair of bevel gears 21, 22a, and the pair of bevel gears 23, 24a, and the cooperating bevel gears of the rotor shafts 3 and 7.

The pilot may increase or decrease the speed of the rotors, for change of their rotative speed and pull upon the air, by any such control of the power of the turbines, as is commonly used with turbines and is well known, such means not being shown. The rotors are shown without incidence changing means for the rotor blades 14 and 16, but such means may be provided in any construction, since such means are well known.

Referring to Figures 5, 6, and 7, these figures illustrate a somewhat modified form of the rotor pylon changing means and the associated means, and also in this form, the use of a single turbine for driving the rotors. In Figure 5, the beam 1 is shown as having a divided section 1b, in which is supported the one turbine M2. The turbine M2, by its single shaft 24b, drives one bevel gear 67, and the latter drives the bevel gears on opposite sides in opposite directions, these two bevel gears, 68, 69, one on shaft 70, one on shaft 71, the shafts having small spur gears 72, 73, respectively, fixed on their opposite ends. The spur gears 72, 73, drive respectively, to larger spur gears 74, 75, the latter fixed on short shafts 76, 77, respectively, and small bevel gears 78, 79, are fixed on the inner or opposite ends of shafts 76, 77. The bevel gears 78, 79, are in engagement, each with a larger gear 80 on one side and a larger gear 81 on the opposite side, so that the bevel gears 78, 79, thus drive the two tubular shafts 82, 83, on co-incidental axes, in opposite directions. The tubular shafts 82, 83, have the rotor hubs 9 and 12, fixed on them, respectively, and these respectively, carry the airfoil blades 14, and 16, to be rotated in opposite directions.

The tubular shafts 82, 83, are rotatably mounted on one rotor pylon or post 84, which at its outer or remote end has fixed on it the thrust disk 85 and there is a ball bearing 86 between this and the top rotor hub 12, and there is another ball bearing 87 between rotor hub 12 and rotor hub 9, so that thereby the rotor pylon 84 takes thrust directed along the axis of the pylon and leftwardly, in Figure 5, by the ball bearings 86, 87, and the rotor pylon transmits this thrust in turn by cross member 88 formed with or secured to rotor pylon 84, and the thrust is thereby transmitted to a pair of large diameter support hubs 89 which, at their centers of oscillation, or axes, are rotatably, that is, oscillatively, mounted by internal bores on the external cylindrical surfaces of the two mounting bearings or fixtures 90, which individually are formed with or are firmly secured by any means in assembly to the extreme front end of the beam 1. The two mounting bearings or fixtures 90 form a bifurcated front end of the beam 1 and between the members 90 there is a space as shown in Figure 5 wherein the bevel gears 67, 68, 69, are mounted and rotatable.

The two support hubs 89 have formed on their external cylindrical surfaces sectors of worm gears each denoted 91, and the sector on each support hub 89 occupies a little more than 120 or 135 degrees of the circumference, and these worm gear sectors 91 are each in permanent engagement with an associated one of two worm gear pinions 92, each of which is formed on or fixed on its shaft 93, and each of the two latter are in engagement with or have formed therewith, one of the two bevel gears 94 each engaging one gear 94a on shaft 95 of electric motor 96. The shafts 93 are rotatably mounted in bearing fixtures 97 attached to or formed on the forward end of beam 1 adjacent to the worm gears, and the electric motor 96 is supplied with current and controlled by reversing switch means and main switch as or similar to the control diagram of Figure 4, this control being not more particularly shown, as it may be understood that this control and that of the other form, may be as controls are normally used with electric motors.

The turbine M2 will in the case of this modified form receive its air supply from the space M3 which space is on its top side and its lower side open to the atmosphere or any air scoop means, not otherwise shown. This modified form is mounted on any aircraft, as the first form shown, may be, and it is operated and controlled by the pilot as the first form is, by the electric motor 96, so that the rotor pylon post 84, may be moved in the vertical plane which is at right angles to the axes of shafts 70, 71, and bearing mountings 90, and on these axes which are horizontal, as a bearing, the rotor pylon 84 may be placed in any position from the horizontal, to a ninety degree vertical position, or a thirty to 45 degree forward position, or a position 30 to 45 degrees rearwardly from the vertical. The turbine shaft 24b drives the rotor hubs 9 and 12 and their airfoil blades in opposite directions, and the rotor pylon post 84 and the elements carried with it are oscillated on the hubs 90 about their axes, the gears 74, 75, moving in an arc over the circumference of spur gears 72, 73, in such changing of position, or axes of rotation.

Thrust of the rotors in the case of the first form described is taken by the upward bearing of the bevel gear 11 against bevel gear 8, and the upward bearing of the bevel gear 8 against the near end of the rotor pylon 5, so that this bearing of one against the other transmits the upward or forward thrust of the rotors on their shafts 7 and 10 to the bifurcated end or members 6, and thereby to bearing mountings or fixtures 4, and thus to member 2 and beam 1. Members 6 are support hubs, and may be so-called, for description. Ball bearings may be interposed between 11 and 8 and 8 and 5.

While I have shown particular devices and combinations of devices in the description and illustration of my invention, I contemplate that other detailed devices and combinations of devices may be utilized in the realization of my invention, without departing from the spirit and contemplation thereof.

What I claim is:

An airfoil rotor and power unit for aircraft, comprising: a supporting beam, a bifurcated support member on one end of the supporting beam and a pair of support bearings formed one in each arm of the bifurcated support member and in axial alignment transversely of the support member; a rotor pylon having oscillative mounting by a pair of bearing straps one on each support bearing to be pivotable on the axis of the said support bearings; a rotor bearing on the rotor pylon and a pair of contra-rotative airfoil rotors rotatably mounted in said rotor bearing, each airfoil rotor having a driving shaft one tubular and the other rotatable internally thereof and each rotatable on an axis coincident with that of the other and at right angles to the said axis of the said support bearings; a pair of driven bevel gears one fixed on one driving shaft and the other on the other driving shaft; a pair of driving bevel gears each fixed on one of two shafts which are rotatable on an axis coincident with said axis of the support bearings, one in engagement with one driven bevel gear and the other in engagement with the other driven bevel gear; an engine means mounted on said support beam and having driving shafts and gear means in engagement with said shafts of said driving bevel gears; a pair of arcuate geared members one fixed on each of said bearing straps and arcuately of its axis; a control gear means in engagement with said arcuate geared members and a reversible electric motor means in driving engagement with said control gear means and control means for said electric motor means.

References Cited in the file of this patent

UNITED STATES PATENTS

| | | |
|---|---|---|
| D. Re. 22,029 | Nebesar | Feb. 17, 1942 |
| 1,189,680 | Gardner | July 4, 1916 |
| 1,414,241 | Wells | Apr. 25, 1922 |
| 1,681,019 | Stewart | Aug. 14, 1928 |
| 1,788,430 | Hall | Jan. 13, 1931 |
| 1,795,334 | Hall | Mar. 10, 1931 |
| 1,806,648 | Salisbury | May 26, 1931 |
| 1,842,613 | Karr | Jan. 26, 1932 |
| 1,916,092 | Bleriot | June 27, 1933 |
| 2,461,669 | Wiley | Feb. 15, 1949 |